US008266663B2

(12) United States Patent
McCarthy et al.

(10) Patent No.: US 8,266,663 B2
(45) Date of Patent: Sep. 11, 2012

(54) INTERACTIVE CONTENT SYSTEM AND METHOD

(75) Inventors: Mary McCarthy, San Antonio, TX (US); Scott Pettit, San Antonio, TX (US); John McClenny, San Antonio, TX (US); Roland Noll, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 691 days.

(21) Appl. No.: 11/497,508

(22) Filed: Aug. 1, 2006

(65) Prior Publication Data

US 2008/0034392 A1    Feb. 7, 2008

(51) Int. Cl.
*H04N 7/173* (2011.01)
(52) U.S. Cl. .......... 725/105; 725/37; 725/109; 725/112; 725/114; 725/136
(58) Field of Classification Search .................... 725/24, 725/61, 109, 116, 136, 37, 112, 114
See application file for complete search history.

(56) References Cited

U.S. PATENT DOCUMENTS

| 5,790,935 | A  | * | 8/1998 | Payton ............................. 725/91 |
| 5,798,785 | A  | * | 8/1998 | Hendricks et al. ............ 725/116 |
| 6,947,966 | B1 | * | 9/2005 | Oko et al. ....................... 725/111 |
| 7,222,155 | B1 | * | 5/2007 | Gebhardt et al. ................ 725/61 |
| 7,840,977 | B2 | * | 11/2010 | Walker et al. .................... 725/38 |
| 2002/0042914 | A1 | * | 4/2002 | Walker et al. .................... 725/36 |
| 2002/0147984 | A1 | * | 10/2002 | Tomsen et al. ................. 725/109 |
| 2002/0157099 | A1 |   | 10/2002 | Schrader et al. |
| 2004/0036779 | A1 |   | 2/2004 | Cazier et al. |
| 2005/0120391 | A1 | * | 6/2005 | Haynie et al. .................... 725/24 |
| 2005/0149988 | A1 | * | 7/2005 | Grannan ......................... 725/136 |
| 2005/0177850 | A1 |   | 8/2005 | Boylan, III et al. |
| 2005/0235319 | A1 |   | 10/2005 | Carpenter et al. |
| 2005/0240982 | A1 | * | 10/2005 | Blackketter et al. .......... 725/109 |
| 2005/0283800 | A1 |   | 12/2005 | Ellis et al. |
| 2006/0010471 | A1 |   | 1/2006 | Zigmond |
| 2006/0117340 | A1 |   | 6/2006 | Pavlovskaia et al. |
| 2006/0184989 | A1 | * | 8/2006 | Slothouber .................... 725/110 |

FOREIGN PATENT DOCUMENTS

WO     2004010694 A     1/2004

OTHER PUBLICATIONS

International Search Report for International Application No. PCT/US2007/015590, mailed on Jan. 28, 2008.
Written Opinion of the International Searching Authority for PCT/US2007/015590, mailed on Jan. 28, 2008.

* cited by examiner

*Primary Examiner* — Scott Beliveau
*Assistant Examiner* — Jeremy Duffield
(74) *Attorney, Agent, or Firm* — Toler Law Group

(57) ABSTRACT

The present disclosure is directed to a system and method of providing interactive content. The method can include receiving a video signal from a first source of a television system, where the video signal includes video content but does not include data relating to an interactive application. The method can also include retrieving an interactive application from a second source of the television system.

22 Claims, 5 Drawing Sheets

INTERACTIVE CONTENT SYSTEM AND METHOD

FIELD OF THE DISCLOSURE

The present disclosure relates generally to providing interactive content.

BACKGROUND

Interactive television enables a viewer to exchange information via a television, and thus enjoy an interactive viewing experience. Interactive television systems traditionally indicate an availability of interactive content within a television signal. When the television signal is received and the indication of interactive content detected, an icon is typically displayed on a viewer's display to indicate the available interactive content. The icon may be selected via a remote control to launch the interactive application.

Encoding the indication of the interactive content via the video signal introduces additional processing and complexity to the function of sending the video signal. Furthermore, requiring the encoding for each interactive application into the video signal may create a bottleneck to developing and distributing new interactive applications.

DETAILED DESCRIPTION OF THE DRAWINGS

In one embodiment, a method of receiving interactive content is disclosed. The method includes receiving a video signal from a first source of a television system, where the video signal includes video content but does not include data relating to an interactive application. The method also includes providing the video content to a display device and retrieving an interactive application from a second source of the television system.

In another embodiment, a user interface is disclosed. The user interface includes a first display region to display video content received from a television system via a television channel and a second display region to display a prioritized menu of available interactive applications.

In another embodiment, a set-top box is disclosed. The set-top box includes a memory device accessible to a processor, a network interface to communicate with a source of content, a display interface to communicate with a display device, and a buffer to receive video content from the source of content via the network interface. The set-top box also includes an interactive application module to provide an indication of available interactive applications via the display interface in response to receiving a first user request.

Figure 1:
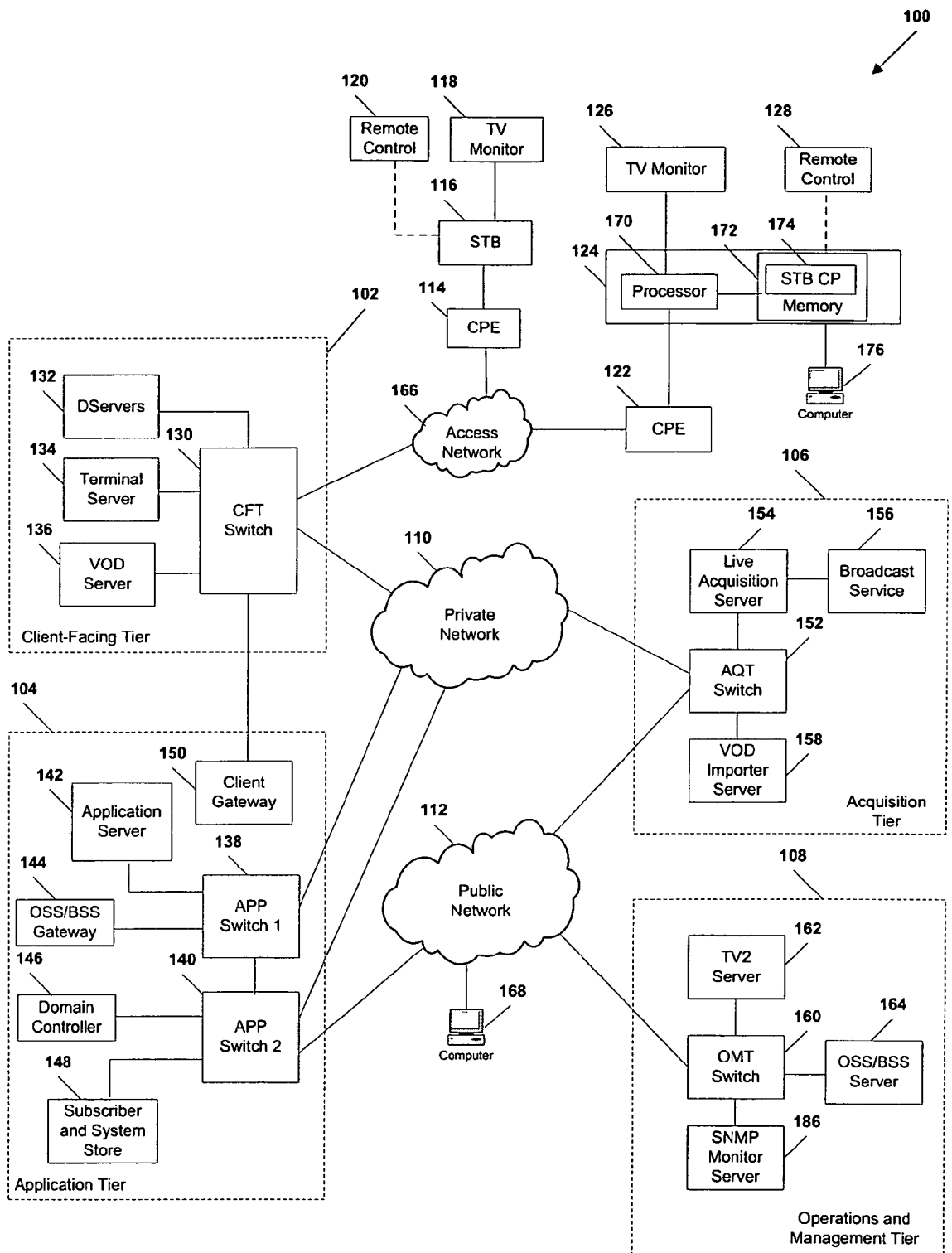
FIG. 1 is a block diagram illustrating an embodiment of an Internet Protocol Television (IPTV) system.

Referring to FIG. 1, an illustrative embodiment of an Internet Protocol Television (IPTV) system that may be used to share private content is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 at a first customer premise via the first CPE 114 and with a second representative set-top box device 124 at a second customer premise via the second CPE 122. The CPE 114, 122 can include routers, local area network devices, modems, such as digital subscriber line (DSL) modems, any other suitable devices for facilitating communication between a set-top box device and the access network 166, or any combination thereof.

In a particular embodiment, the client-facing tier 102 can be coupled to the CPE 114, 122 via fiber optic cables. Alternatively, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a set-top box (STB) processor 170 and a STB memory device 172 that is accessible to the STB processor 170. In one embodiment, a computer program, such as the STB computer program 174, can be embedded within the STB memory device 172. In another illustrative embodiment, a user computing device 184, such as a personal computer, laptop or local server, can be coupled to a set-top box device, such as the second representative set-top box device 124, for example, via a universal serial bus (USB) connection or other connection.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100.

In an illustrative embodiment, the client-facing tier 102 can communicate with a large number of set-top boxes, such as the representative set-top boxes 116, 124 over a wide geographic area, such as a regional area, a metropolitan area, a viewing area, a designated market area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that feeds one or more video streams from a video server to multiple set-top box devices.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses of corresponding set-top box devices 116, 124.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication to the set-top box devices 116, 124. The CFT switch 130 can receive content and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer (PC) 168 coupled to the public network 112.

Figure 2:
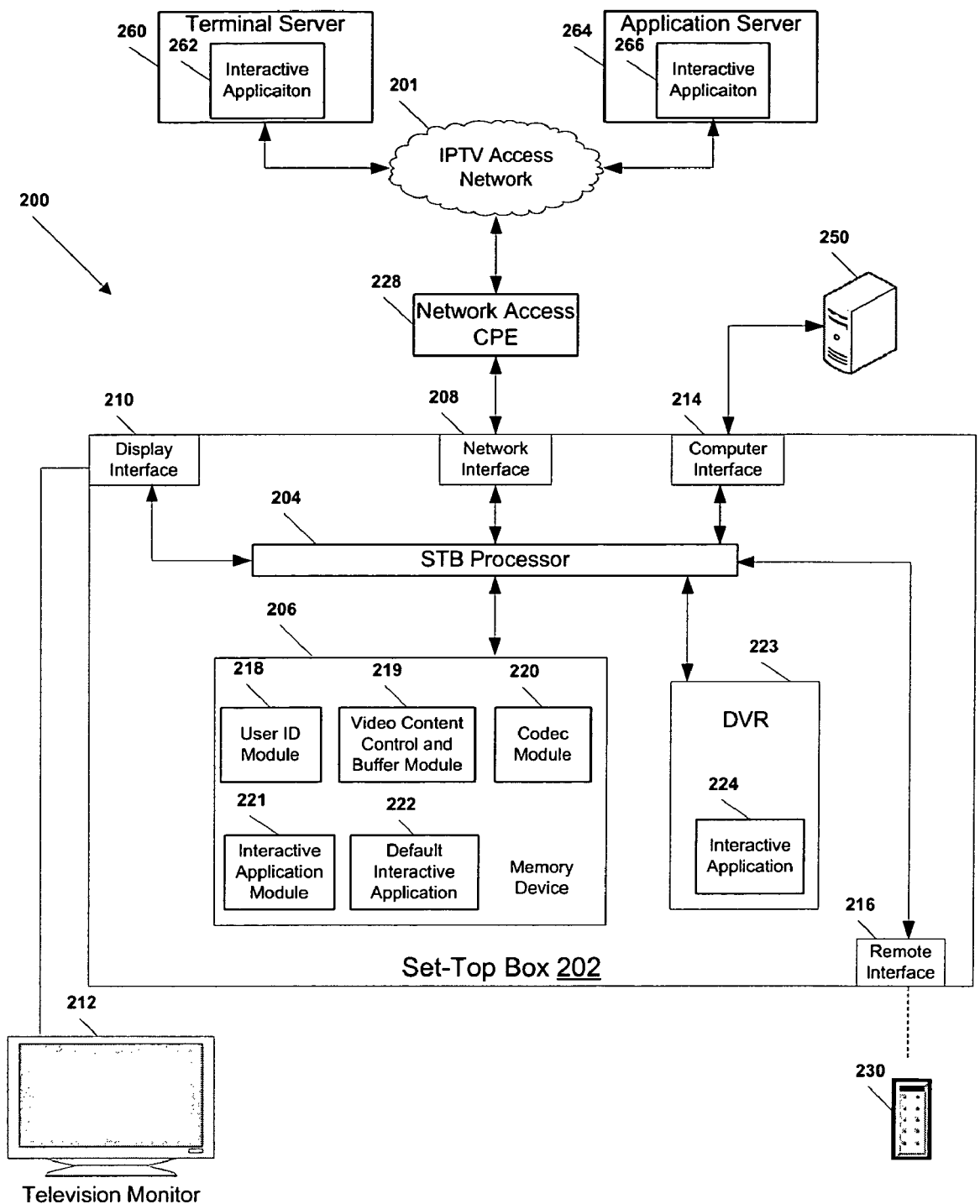
FIG. 2 is a block diagram illustrating an embodiment of a system having a set-top box.

Referring to FIG. 2, an embodiment of a system that includes a representative set-top box is depicted and generally designated 200. The system 200 includes an internet protocol television (IPTV) access network 201 in communication with a terminal server 260 and further in communication with an application server 264. A set-top box 202 is shown in communication with the IPTV access network 201 via network access customer premise equipment (CPE) 228.

The set-top box 202 includes a display interface 210 to communicate with a display device such as a television monitor 212. The set-top box 202 also includes a computer interface 214 to communicate with a computer 250. A remote interface 216 enables the set-top box to wirelessly communicate with a remote control device 230. A network interface 208 enables the set-top box 202 to communicate with a source of content, depicted in FIG. 2 as the IPTV access network 201.

A set-top box processor 204 is coupled to each of the display interface 210, the network interface 208, the computer interface 214, and the remote interface 216. The processor 204 is also coupled to a memory device 206 and a digital video recorder (DVR) 223. The set-top box 202 also includes a user ID module 218 for identifying a user of the set-top box 202 and a video content control and buffer module 219 to receive video content from the source of content via the network interface 208. The set-top box 202 further includes a coder-decoder module (codec) 220 for decoding video content received from the source of content, such as IPTV access network 201, for display on the display device 212.

In an embodiment, the set-top box 202 includes an interactive application module 221. The interactive application module 221 can provide an indication of available interactive applications via the display interface 210 in response to receiving a user request. As an example, a user of the display device 212 may desire to view available interactive applications. The user may request an indication of the available interactive applications by pressing a button on the remote control device 230.

In a particular embodiment, the interactive application module 221 may send a request for an identification of an available interactive application associated with the video content to the source of content, such as the IPTV access network 201, in response to receiving the user request. The IPTV access network 201 may respond by sending to the set-top box 202 data identifying interactive applications available via the IPTV access network 201. As an illustrative example, the IPTV access network may respond by providing data identifying an interactive application 262 located at the terminal server 260 and data identifying an interactive application 266 located at the application server 264, or both.

Interactive applications may also be located at other locations of the system 200. For example, in a particular embodiment, the DVR 223 may store one or more interactive applications 224. In another particular embodiment, a default interactive application 222 may be stored at the set-top box 202. An availability of the default interactive application 222 may be independent of the video content received from the source of content, such as IPTV access network 201.

In operation, a user of the set-top box 202 may desire to view available interactive applications related to the video content displayed on the television monitor 212. For example, a user of the set-top box 202 watching a football game may desire to view interactive content related to the football game, the television channel associated with the football game, or the television system generally. The user may request a listing of available interactive applications by pressing an interactive button on the remote control 230.

In response to the set-top box 202 receiving the user request for an indication of available interactive applications, the interactive application module 221 may send a request for available interactive content via the network interface 208 to the IPTV access network 201. The request may identify, for example, the set-top box 202, the user, or the video content such as the television program or the television channel, or any combination thereof.

In an embodiment, the request sent by the set-top box 202 may be sent to a single location of the IPTV system to execute an application that polls all applicable locations of the IPTV system for available interactive applications. In another embodiment, the request sent by the set-top box 202 may instead indicate each location of the IPTV system to be polled for available interactive content. Examples of applicable locations of an IPTV system that may be polled for interactive applications include terminal servers such as terminal servers 134 of FIG. 1, application servers 142, VOD severs 136, other servers or computers connected to the IPTV system 100, such as computer 168, or any combination thereof. The interactive application module 221 may also query other locations of system 200, such as the DVR 223 and the memory device 206 of the set-top box 202 for further interactive applications that may be stored locally, such as default interactive application 222.

After receiving a first result from the request to the IPTV access network 201, and a second result from the search conducted of the local memory devices 206 and the DVR 223 of the set-top box 202, the interactive application module 221 may provide a selectable menu indicating the available interactive applications that were located to display on the television monitor 212. A user of the television monitor 212 and remote control 230 may select one of the interactive applications to be executed from the selectable menu. The available interactive applications may be indicated on the selectable menu by an application name, a description, an icon, or the like, or any combination thereof. The indications used for the available interactive application may be provided to the interactive application module 221 as a response to the query, or may be retrieved from various source of the IPTV access network 201, or may be stored locally in the memory device 206, or any combination thereof.

In a particular embodiment, when the default interactive application 222 is the only interactive application that is available, a menu of available interactive applications showing only the default interactive application may not be displayed on the television monitor 212. Instead, the processor 204 of the set-top box 202 may execute the default interactive application 222 in response to the user request.

In another particular embodiment, the interactive application module 221 may be further operable to update an indication of the default interactive application 222 when a replacement default interactive application (not shown) is received from the IPTV access network 201. For example, the IPTV access network 201 may periodically replace the available default interactive applications at customer set-top boxes such as the set-top box 202. Thus, a replacement default interactive application my be received by the set-top box 202 via the network interface 208 from the IPTV access network 201 and stored in the memory device 206.

In a particular embodiment, the replacement default interactive application may overwrite the previous default interactive application stored in memory device 206. The interactive application module 221 may update the indication of the available default interactive application 222 when the replacement default interactive application is received. The updated indication of the replacement interactive application may therefore be displayed when the user requests to view available interactive applications.

In another particular embodiment, the replacement default interactive application received from the IPTV access network 201 may reside in memory device 206 in addition to the prior default interactive application. The interactive application module 221 may therefore provide an indication of each of the prior default interactive application and the replacement default interactive application to a user of the set-top box 202 when the user requests to view available interactive applications.

Figure 3:
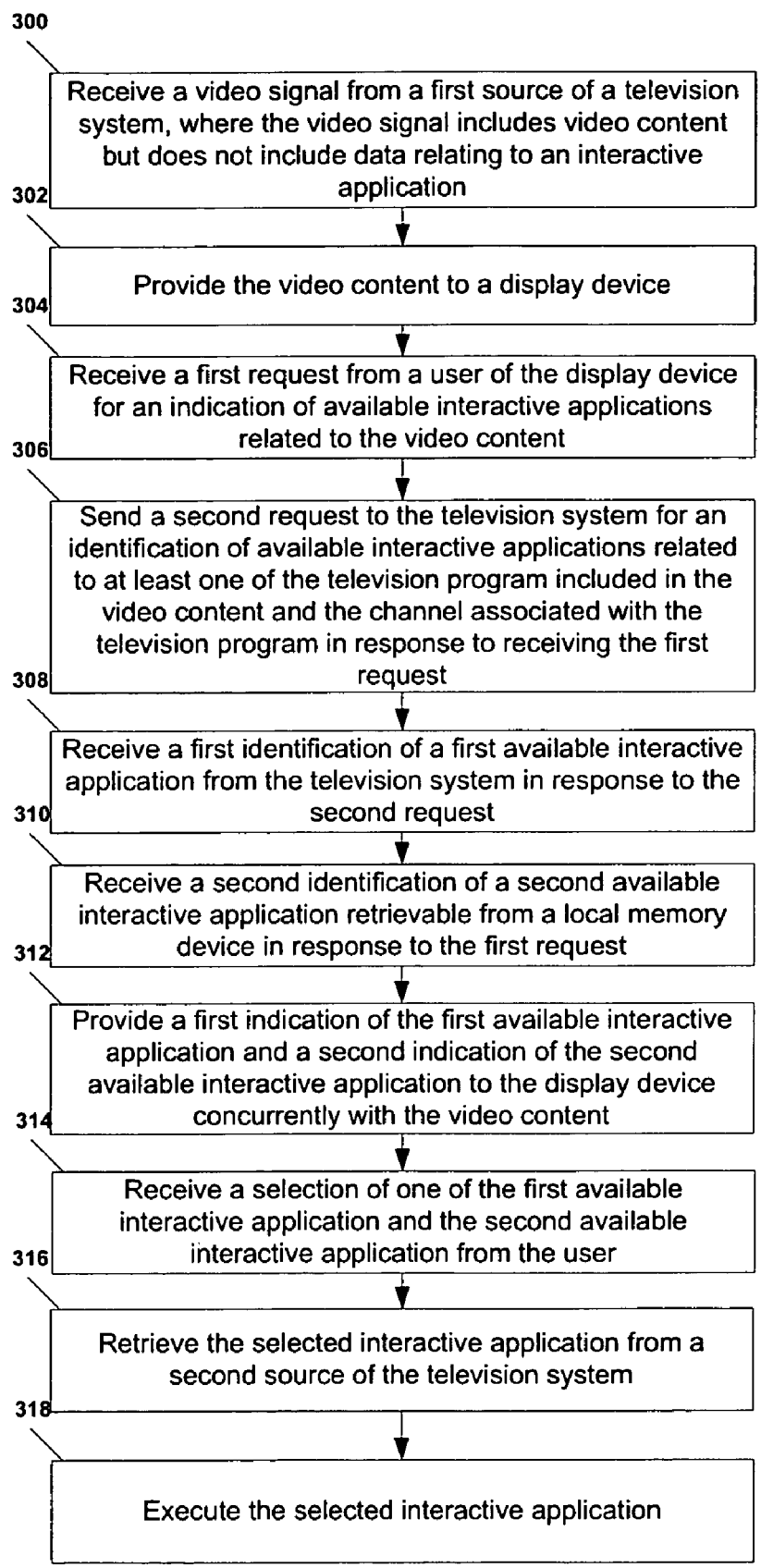
FIG. 3 is a flow diagram illustrating an embodiment of a method of receiving interactive content.

Referring to FIG. 3, a particular embodiment of a method is depicted. Generally, the method includes receiving a video signal from a first source of the television system where the video signal includes video content but does not include data relating to an interactive application, providing the video content to a display device, and retrieving an interactive application from a second source of the television system.

In the particular embodiment depicted in FIG. 3, the method begins at block 300 with receiving a video signal from a first source of a television system, where the video signal includes video content but does not include data relating to an interactive application. The method continues at 302, with providing the video content to a display device, and receiving a first request from a user of the display device for an indication of available interactive applications relating to the video content at 304. Continuing at 306, a second request is sent to the television system for an identification of available interactive applications related to at least one of the television program included in the video content and the channel associated with the television program, in response to receiving the first request. At 308, a first identification is received of a first available interactive application from the television system in response to the second request. At 310, a second identification is received of a second available interactive application retrievable from a local memory device in response to the first request.

At 312, a first indication is provided of the first available interactive application and a second indication of the second available interactive application to the display device concurrently with the video content. A selection of one of the first available interactive application and the second available interactive applications is received from the user at 314, and the selected interactive application is retrieved from a second source of the television system at 316. The selected interactive application is executed at 318.

As a particular, non-limiting example, the method depicted in FIG. 3 may be performed by a set-top box such as the set-top box 116 in communication with the IPTV system 100 of FIG. 1. A user of the set-top box 116 may be authorized to access some interactive applications but not others, as may be determined by the OSS/BSS server 164. The first indication of the first available application received at 308 may therefore be sent only when the user is authorized to access the application. As another example, a selected interactive application may be associated with a television channel. The OSS/BSS server 164 may control a user's access to some interactive applications by modifying a channel map associated with the user. An interactive application selected by the user may therefore be retrieved at 316 by the set-top box requesting content associated with the television channel from the IPTV system.

In an embodiment, the indication of the first available interactive application and the second available interactive application may be provided to the display device to be displayed in a prioritized menu at 312. In a particular embodiment, the first available interactive application is associated with the television program, and the second available interactive application is not associated with the television program. A priority of the first available interactive application may thus be determined to be higher than a priority of the second available interactive application. The indication of the first available interactive application may therefore be displayed above the indication of the second available interactive application in the prioritized menu according to the determined priority.

Figure 4:
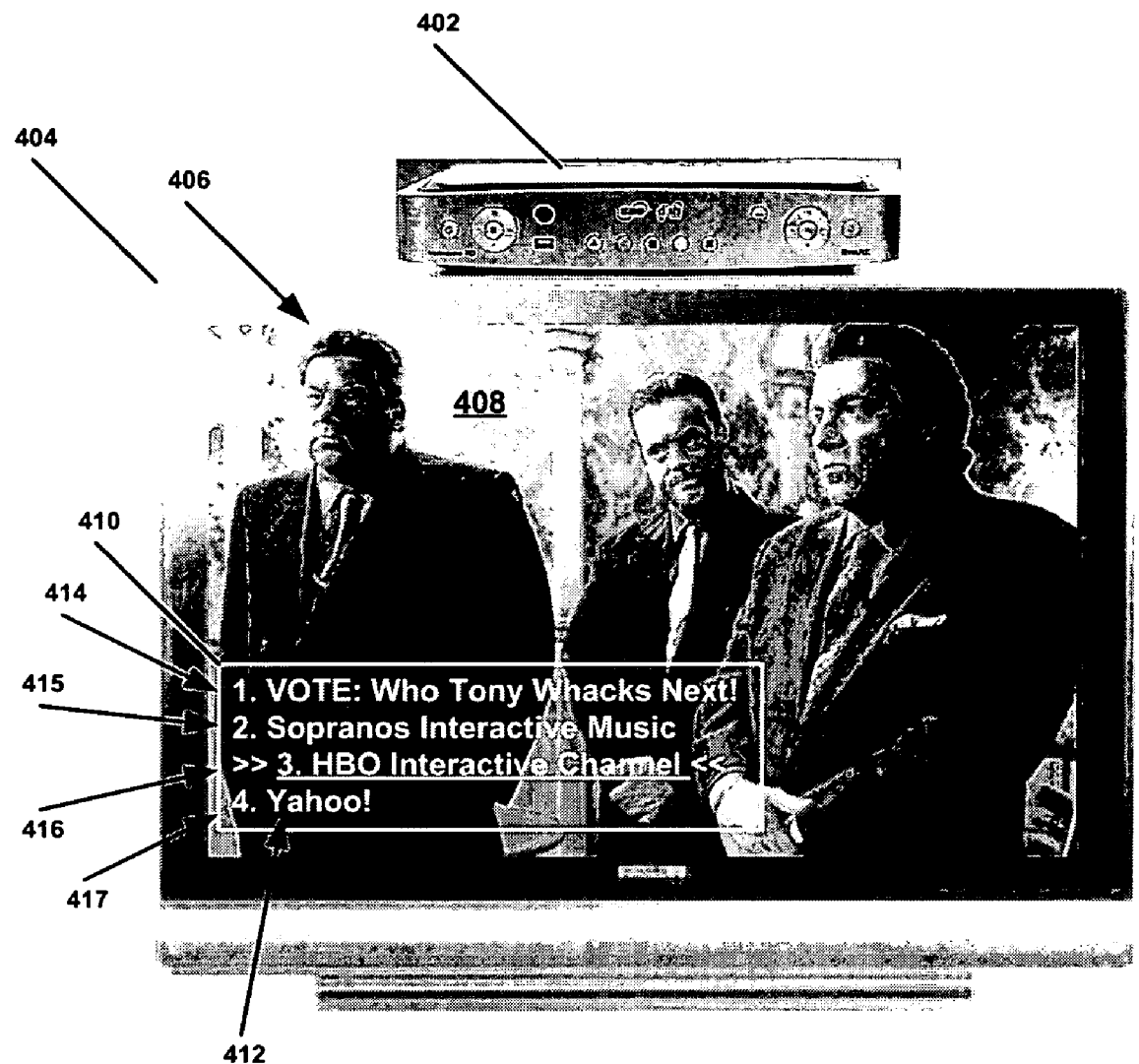
FIG. 4 is a diagram of an embodiment of a graphical user interface.

Referring to FIG. 4, an embodiment of a user interface 406 is depicted displayed on a display device such as a television monitor 404 coupled to a set-top box 402. The user interface 406 includes a first display region 408 to display video content received from a television system via a television channel. The user interface 406 also includes a second display region 410 to display a prioritized menu 412 of available interactive applications. The available interactive applications are identified by menu items 414, 415, 416, 417.

In the embodiment depicted in FIG. 4, the video content displayed in the first display region 408 is the television program The Sopranos associated with the television channel HBO, and each available interactive application identified by the menu items 414, 415, 416, 417 relates to one of the television program, the television channel, or the television system generally. For example, the first menu item 414 of the prioritized menu 412 indicates an interactive application that provides a viewer with an ability to vote for a possible outcome of the television program. The second menu item 415 indicates an available interactive application that provides a user of the user interface 408 with the ability to listen to interactive music associated with the television program. The third menu item 416 indicates an available interactive application that is related to the television channel providing the television program. The fourth menu item 417 indicates an interactive application that is not specifically associated with the television program or the television channel but is generally associated with the television system.

In an embodiment, at least one interactive application indicated by the prioritized menu 412 is a default application. For example, the fourth menu item 417 may indicate that a default interactive application is available and may be displayed with the lowest priority of the available interactive applications. The default interactive application, such as the interactive application indicated by the fourth menu item 417, may be available while a first television program received via a first television channel is displayed in the first display region 408 and may also be available when a second television program received via a second television channel is displayed in the first display region 408. Thus, the default interactive application may be displayed persistently on the user interface 406, independent of the television program or the television channel associated with the video content.

In a particular embodiment, a priority of at least a first available interactive application indicated by the prioritized menu 412 may be determined in accordance with an association of the first available interactive application with the television program. In another embodiment, a priority of at least a second interactive application of the prioritized menu 412 may be determined in accordance with an association of the second available interactive application with the television channel. In the embodiment depicted in FIG. 4, the interactive application having the highest priority, indicated by the first menu item 414, is associated with the television show displayed on the user interface in the first display region 408. The interactive application having the second highest priority, indicated by the second menu item 415, is also associated with the television program. The interactive application having the third highest priority, indicated by the third menu item 416, is associated with the television channel, and the fourth interactive application, indicated by the fourth menu item 417, is associated with neither the television program nor the channel.

However, in a particular embodiment, a priority of one or more of the available interactive applications may be determined through other mechanisms. As an illustrative, non-limiting example, a priority of a first available interactive application may be determined by a first source of the television system such as the set-top box 402. In another illustrative, non-limiting example, a priority of a second application is determined by a second source of the television system providing the television program, such as by a source within an internet protocol television (IPTV) system.

Figure 5:
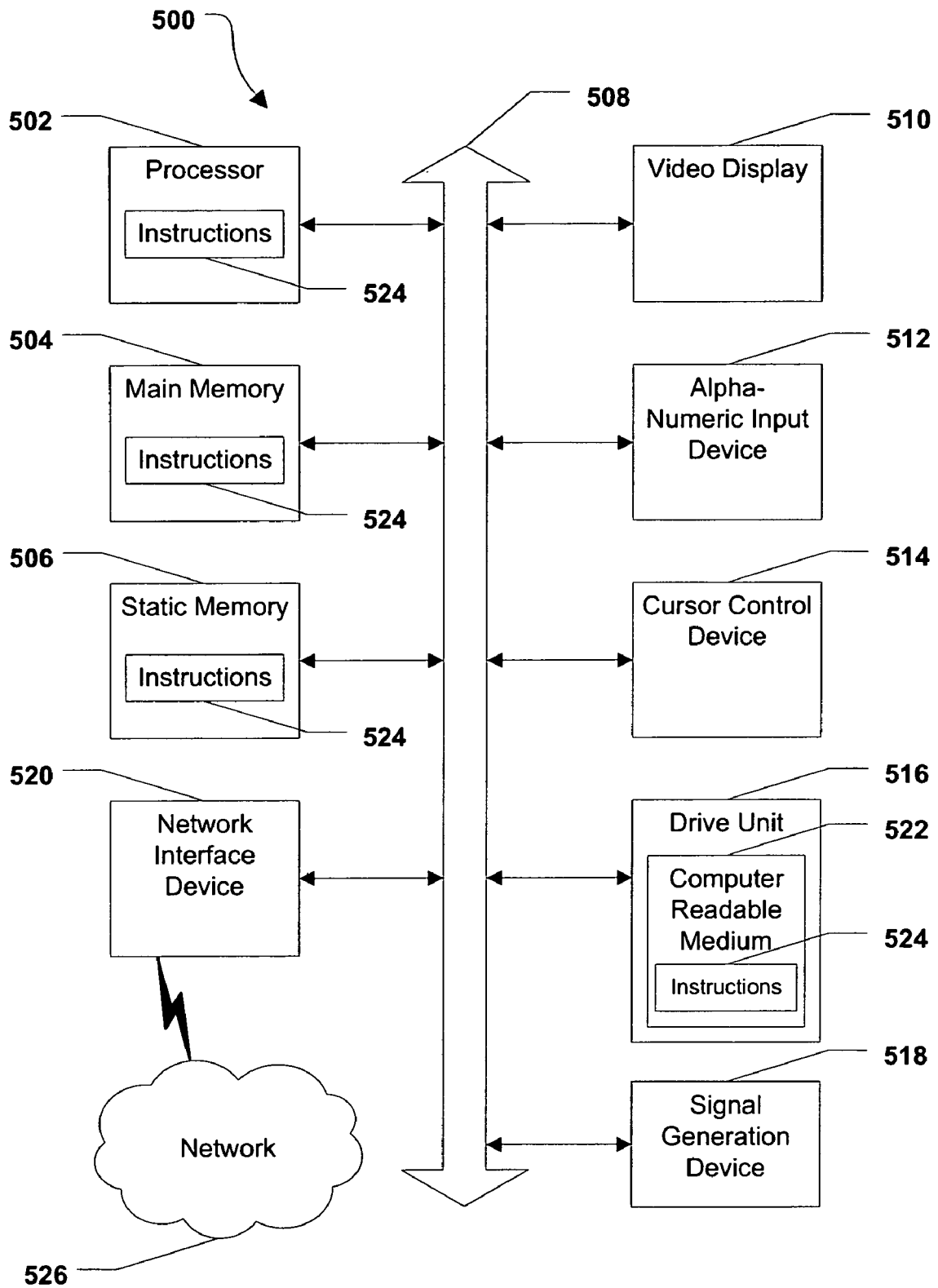
FIG. 5 is a diagram of an embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device, such as the set-top box devices and domain controller shown in FIG. 1, or may be connected, e.g., using a public network or a private network within an IPTV system, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. Further, the computer system 500 can include a wireless input device 515, e.g., a remote control device. When the computer system 500, or any portion thereof, is embodied in a set-top box device, the cursor control device 514 can be a remote control device. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed may determine available interactive applications from a source of video content such as an IPTV system. A selectable menu of indicators may be provided via a display device for a user selection.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    sending video content retrieved at a set-top box from a first source of a television system to a display device;
    receiving a first request at the set-top box for interactive content;
    sending a second request from the set-top box to at least one second source of the television system for identification of available interactive applications related to the video content in response to the first request, wherein the second request indicates one or more locations within the television system to be polled for the available interactive applications, and wherein access to the available interactive applications is authorized based on a user account associated with the television system; and
    sending a prioritized menu from the set-top box to the display device concurrently with the video content when one or more identifications of the available interactive applications related to the video content are received in response to the second request, wherein the prioritized menu includes a selectable menu item associated with the one or more identifications of the available interactive applications related to the video content received in response to the second request and an additional selectable menu item associated with a default interactive application retrieved from the set-top box, and wherein selectable menu items associated with the one or more identifications of the available interactive applications related to the video content have a first priority and are displayed in the prioritized menu in a position indicative of a higher priority than a position of the additional selectable menu item.

2. The method of claim 1, wherein the television system is an Internet protocol television system.

3. The method of claim 2, wherein the video content includes a television program associated with a television channel.

4. The method of claim 1, further comprising executing the default interactive application when no response to the second request is received.

5. The method of claim 2, wherein the user account is identified based on set-top box data included with the request.

6. The method of claim 5, wherein the one or more locations within the television system include at least one of a terminal server, an application server, and a video-on-demand server.

7. The method of claim 1, further comprising:
    receiving at the set-top box a selection of at least one of the selectable menu items and the additional selectable menu item from a user of the set-top box; and
    executing one or more interactive applications corresponding to the selection.

8. The method of claim 3, wherein a first selectable menu item corresponds to a first identification of a first available interactive application received in response to the second request and is associated with the video content, wherein a second selectable menu item corresponds to a second identification of a second available interactive application received in response to the second request and is associated with the television channel, and wherein the first selectable menu item is displayed in a position indicative of higher priority in the prioritized menu as compared to a position in the prioritized menu of the second selectable menu item.

9. A set top box device, comprising:
    a memory device accessible to a processor;
    a network interface to communicate with a source of content from a distribution network of a television system;
    a buffer to receive video content from the source of content via the network interface; and
    an interactive application module operable to:
        send a request to the distribution network, the request indicating one or more locations of the distribution network to be polled for a first available interactive application;
        generate a prioritized menu including available interactive applications, the prioritized menu generated in response to receipt of a result identifying the first available interactive application located within the distribution network, wherein the prioritized menu includes a selectable menu item for each of the available interactive applications and for at least one default interactive application retrieved from the memory device, and wherein access to the available interactive applications is authorized based on a user account associated with the television system; and
        send to a display device the prioritized menu and the video content concurrently in response to a user request for interactive content, wherein the available interactive applications related to the video content have a first priority and are displayed first in the prioritized menu.

10. The set top box device of claim 9, wherein the user account is identified based on set top box data included with the request.

11. The set top box device of claim 9, wherein the interactive application module is further operable to retrieve a second available interactive application by performing a search of the memory device, and wherein the first available interactive application is distinct from the second available interactive application.

12. The method of claim 1, further comprising displaying the default interactive application as the prioritized menu when no response to the second request is received.

13. The method of claim 1, wherein the video content comprises a television program, and wherein a first interactive application provides a viewer with an ability to vote for a possible outcome of the television program.

14. The method of claim 1, wherein selectable menu items associated with identifications of the available interactive applications associated with the video content have a highest priority in the prioritized menu, and wherein selectable menu items associated with identifications of the available interactive applications related to a television channel providing the video content have a second priority that is less than the highest priority and are displayed below the selectable menu items with the highest priority in the prioritized menu.

15. The method of claim 14, wherein the additional selectable menu item associated with the default interactive application has a third priority that is less than the second priority and is displayed last in the prioritized menu.

16. The method of claim 1, wherein the default interactive application is independent of the video content from the first source.

17. The set top box device of claim 9, wherein the interactive application module is further operable to send to the display device an indication of a replacement default interactive application that replaces the at least one default interactive application.

18. A non-transitory computer-readable medium comprising operational instructions that, when executed by a processor, cause the processor to execute a method comprising:
  sending video content retrieved at a set-top box from a first source of a television system to a display device;
  receiving a first request at the set-top box for interactive content;
  sending a second request from the set-top box to the television system for identification of available interactive applications related to the video content in response to the first request, wherein the second request indicates one or more locations within the television system to be polled for the available interactive applications; and
  sending a prioritized menu from the set-top box to the display device concurrently with the video content when one or more identifications of the available interactive applications related to the video content are received in response to the second request, wherein the prioritized menu includes a selectable menu item associated with the one or more identifications of the available interactive applications related to the video content received in response to the second request and an additional selectable menu item associated with a default interactive application retrieved from the set-top box, and wherein selectable menu items associated with the one or more identifications of the available interactive applications related to the video content have a first priority and are displayed in the prioritized menu in a position indicative of a higher priority than a position of the additional selectable menu item.

19. The non-transitory computer-readable medium of claim 18, wherein a priority of a first available interactive application is determined by the first source of the television system.

20. The non-transitory computer-readable medium of claim 19, wherein the television system is an internet protocol television system.

21. The non-transitory computer-readable medium of claim 19, wherein a priority of a second available interactive application is determined by a second source of the television system, wherein the second source is distinct from the first source.

22. The non-transitory computer-readable medium of claim 18, wherein one or more of the available interactive applications associated with the prioritized menu provides a user with an ability to listen to interactive music associated with the video content.

\* \* \* \* \*

UNITED STATES PATENT AND TRADEMARK OFFICE
CERTIFICATE OF CORRECTION

PATENT NO. : 8,266,663 B2
APPLICATION NO. : 11/497508
DATED : September 11, 2012
INVENTOR(S) : Mary McCarthy et al.

It is certified that error appears in the above-identified patent and that said Letters Patent is hereby corrected as shown below:

In the Claims section, Column 13, Claim 2, Line 46, "an Internet protocol television system." should read --an internet protocol television system.--.

Signed and Sealed this
Eighteenth Day of June, 2013

Teresa Stanek Rea
*Acting Director of the United States Patent and Trademark Office*